United States Patent
Richter

[11] 3,871,708
[45] Mar. 18, 1975

[54] CUSTOM WHEEL ASSEMBLY
[75] Inventor: Roy E. Richter, Downey, Calif.
[73] Assignee: Cragar Industries, Inc., Compton, Calif.
[22] Filed: Apr. 10, 1972
[21] Appl. No.: 242,678

[52] U.S. Cl. .......................... 301/9 DN, 301/9 AN
[51] Int. Cl. ............................................. B60b 3/16
[58] Field of Search ........................... 301/9 DN, 65

[56] References Cited
UNITED STATES PATENTS
| | | | |
|---|---|---|---|
| 2,590,363 | 3/1952 | Adair | 301/9 DN |
| 3,329,468 | 7/1967 | Beith | 301/9 DN |
| 3,459,455 | 8/1969 | Muench | 301/9 DN |
| 3,649,079 | 3/1972 | English | 301/9 DN |
| 3,779,610 | 12/1973 | Pansky | 301/9 DN |

Primary Examiner—M. Henson Wood, Jr.
Assistant Examiner—Reinhard J. Eisenzopf
Attorney, Agent, or Firm—Jessup & Beecher

[57] ABSTRACT

A custom wheel assembly is provided which is adapted for universal mounting on automobiles having three different lug bolt circle radii. The wheel assembly of the invention includes a wheel with mounting holes of a particular shape so that the wheel may be firmly and rigidly mounted on a hub whose lug bolts are positioned in any one of the three predetermined circle radii. The mounting holes on the wheel each have an elongated radial dimension to cooperate with lug bolts on the hubs which are positioned at a maximum or minimum bolt circle radii. The holes also have an enlarged central portion which cooperate with the lug bolts of the intermediate circle radii. Sleeve nuts of a particular outer diameter are received by the holes to engage firmly the elongated ends of the mounting holes and to extend into threaded relationship with lug bolts at either the minimum or maximum bolt circle configuration. Enlarged sleeve nuts are used which engage rigidly the edges of the enlarged central portion of the mounting holes, and which extend into threaded relationship with the lug bolts at the intermediate bolt circle radius.

3 Claims, 5 Drawing Figures

PATENTED MAR 18 1975     3,871,708
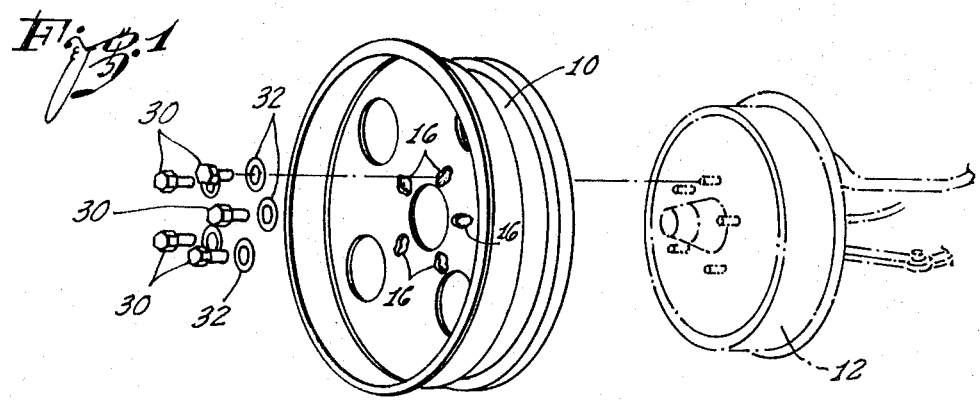
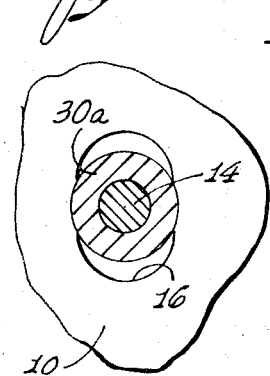
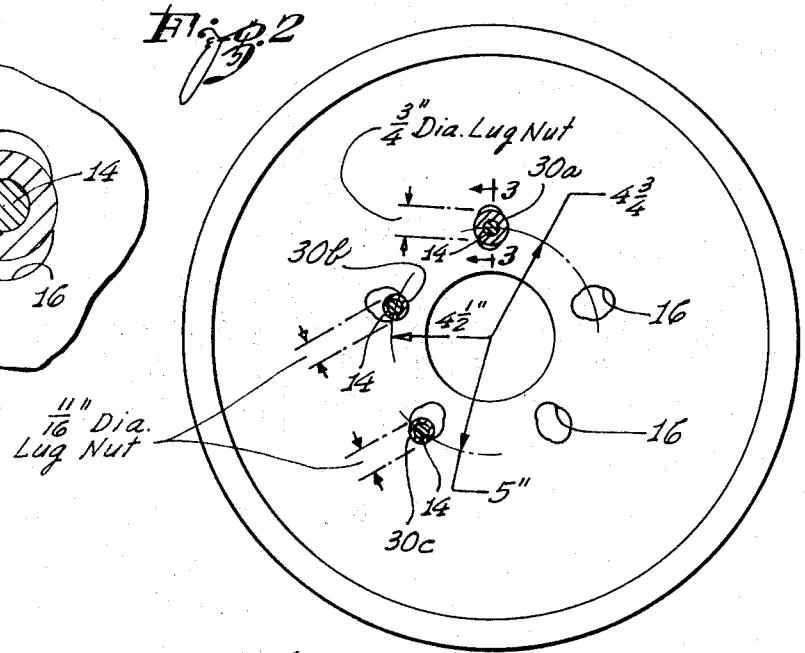
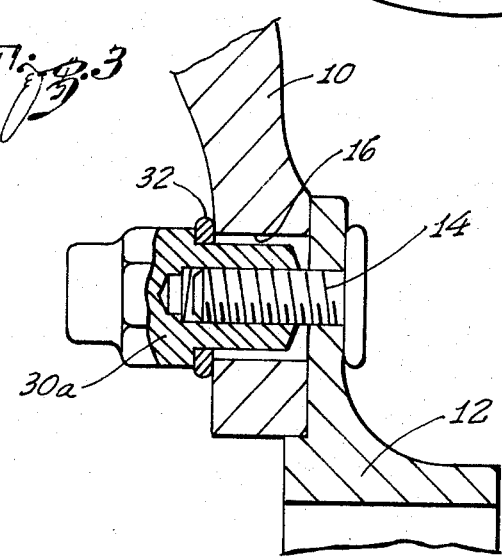
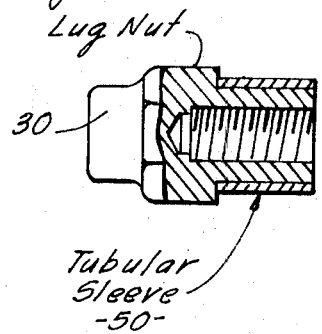

CUSTOM WHEEL ASSEMBLY

RELATED COPENDING APPLICATIONS

Application Ser. No. 189,971, filed Oct. 18, 1971, in the name of the present inventor, and entitled "Custom Wheel Assembly."

BACKGROUND OF THE INVENTION

As described in the aforementioned copending application, decorative wheels are presently available for automobiles, and such wheels are intended to replace the standard wheels with which the automobiles are normally equipped. The decorative wheels are usually formed of highly polished aluminum or magnesium. A problem has arisen in the sale of such decorative wheels in that the lug bolt circle radii of different makes of automobiles varies, and, in the past, the dealer usually had to stock an excessively large number of decorative wheels in order to be able to fit the different makes of cars.

Adapters of various types have been suggested in the prior art in order that a single type of decorative wheel may be used universally on most present day automobiles. All of the major makes of domestic automobiles have lug bolts positioned on the drive hubs at one of three different lug bolt circle radii. Therefore, the adapters of the prior art are usually configured to permit a single custom wheel to be fitted onto lug bolts of any one of the three circle radii, with a different adapter usually being provided, depending upon the lug bolt circle radii of the particular motor car.

The present invention provides an improved type of custom wheel which is constructed so that the mounting holes themselves permit the wheel to be mounted on hubs whose lug bolts are disposed at any one of the three different lug bolt circle radii, so as to eliminate any necessity for adapters, or the like.

BRIEF DESCRIPTION OF THE DRAWINGS

FIG. 1 is a perspective exploded view showing the manner in which the assembly of one embodiment of the present invention is mounted on the drive hub of an automobile;

FIG. 2 is a front view of the wheel of FIG. 1, as it would be mounted on the drive hub, and showing the mounting relationship between the wheel and the drive hub for the three different predetermined lug bolt circle radii of the various makes of motor cars;

FIG. 2A is an enlarged, fragmentary, front view of the hub;

FIG. 3 is a section taken essentially along the lines 3—3 of FIG. 2; and

FIG. 4 is a side section of a typical sleeve nut and tubular sleeve combination, which adapts the sleeve nut to be used in conjunction with the lug bolts of the intermediate circle radii.

DETAILED DESCRIPTION OF THE ILLUSTRATED EMBODIMENT

The custom wheel portion of the assembly of the present invention may take the form shown as 10 in FIG. 1, for example. This wheel, as is common with all such wheels, includes a rim portion for supporting the usual pneumatic tire, and it also includes a central web portion which serves to support the wheel on the hub 12 of the automobile. As illustrated in FIG. 1, the hub 12 includes a plurality of lug bolts which protrude out from the hub at a particular bolt circle radius. It is well known that all major makes of domestic automobiles use one of three different bolt circle radii, these being 4½ inches, 4¾ inches and 5 inches.

The central web portion of the wheel 10 includes a plurality of mounting holes 16, and in accordance with the present invention, these mounting holes are configured to receive the lug bolts 14 at any one of the three standard bolt circle radii. The mounting holes receive sleeve nut means 30 in such a manner that, regardless of which particular bolt circle radius of the three standard radii at which the lug bolts 14 are disposed, nut means 30 will firmly and securely hold the wheel 10 on the hub 12. For that purpose, and as best shown in FIG. 2, each bolt circle 16 is configured to have an enlarged radial dimension, and also to have an enlarged central portion.

As will be explained more fully below, the nut means 30 for the inner radius and the outer radius have a smaller diameter than the nut means 30 for the intermediate radius. This may be effected by giving the sleeve nut 30a for the intermediate radius a larger diameter than that of the sleeve nuts 30b and 30c which serve the inner and outer radii. Alternatively the same size nut 30 may be used in all three positions, with the intermediate position 30a shimmed out by a tubular sleeve 50, as shown in FIG. 4.

The sleeve nut means 30 engage the lug bolts at the three different bolt circle radii in the manner shown, for example, by the cross-hatched areas 30a, 30b and 30c in FIG. 2. For example, if the lug bolt circle is at the intermediate radius, the sleeve nuts 30a fit into the holes 16 at the central portion, and engage firmly the sides of the holes 16, so as to support the wheel rigidly and securely on the hub.

If, on the other hand, the lug nuts are disposed at the minimum circle radius, a slightly smaller diameter sleeve nut, such as designated 30b, is used, and this sleeve nut firmly engages the inner ends of the holes 16. On the other hand, if the lug bolts happen to be disposed at the maximum circle radius, sleeve nuts 30c, of the same diameter as the sleeve nuts 30b, engage the lug bolts, and firmly fit against the outer ends of the holes 16.

In a usual situation, for example, the sleeve nuts 30b and 30c may have an outer diameter of eleven-sixteenth inches, for the bolt circle radii of 4½ inches and 5 inches, whereas the sleeve nuts 30b may have an outer diameter of ¾ inch for the 4¾ inch bolt circle radius.

In the sectional representation of FIG. 3, the manner in which the nut 30a actually engages its corresponding lug bolt 14 may be observed. A washer 32 is interposed between the head of the nut 30a and the wheel.

As noted, the nuts 30a, 30b and 30c may all have a shank outer diameter of the same size, with a tubular sleeve 50 being used in conjunction with the nuts, as shown in FIG. 4, when they are disposed in the central position in the holes 16.

The invention provides, therefore, a simple and improved custom wheel assembly which may be constructed for universal mounting on a variety of makes of automobiles which have their lug bolts disposed at different bolt circle radii, and which does not require any external adapters, or the like.

Although particular embodiments of the invention have been shown and described, modifications may be made, and it is intended to cover all such modifications which fall within the spirit and scope of the invention in the following claims.

What is claimed is:

1. A custom wheel assembly to be mounted on different motor vehicle hubs having mounting lug bolts protruding therefrom and disposed on any one of three different predetermined bolt circle radii comprising:

a wheel including a tire supporting rim and a central web portion having a plurality of oblong mounting holes, each said mounting hole having semi-cylindrical end walls and having its longitudinal dimension radially disposed so as to cooperate with the lug bolts of maximum and minimum bolt circle radii, and having an enlarged arcuate center portion lying on the circumference of a circle of radius larger than that of said end walls, thereby to cooperate with lug bolts on the hub disposed at an intermediate bolt circle radius;

a plurality of sleeve nuts extending into threaded relationship with respective ones of said lug bolts of a particular one of said three bolt circle radii extending through the mounting holes in said web portion;

the sleeve nuts for the lug bolts of maximum and minimum bolt circle radii bearing directly on said semi-cylindrical end walls to retain said wheel in position on the hub;

the sleeve nuts for the lug bolts of the intermediate circle radius having an outer diameter greater than that of the sleeve nuts for the lug bolts of the maximum and minimum bolt circle radii, and bearing on said arcuate center portion, to retain said wheel in position on the hub.

2. A custom wheel assembly to be mounted on different motor vehicle wheel hubs having mounting lug bolts protruding therefrom and disposed on any one of three different predetermined bolt circle radii comprising:

a wheel including a tire-supporting rim and a central web portion having a plurality of oblong mounting holes, each said mounting hole having semi-cylindrical end walls and having its longitudinal dimension radially disposed so as to cooperate with the lug bolts of maximum and minimum bolt circle radii, and having an enlarged arcuate center portion lying on the circumference of a circle of radius larger than that of said end walls, thereby to cooperate with lug bolts on the hub disposed at an intermediate central radius;

a plurality of sleeve nut means extending into threaded relationship with respective ones of said lug bolts of a particular one of said three bolt circle radii extending through the mounting holes in said web portion;

the sleeve nut means for the lug bolts of maximum and minimum bolt circle radii bearing directly on said semi-cylindrical end walls to retain said wheel in position on the hub;

the sleeve nut means for the lug bolts of the intermediate circle radius having an outer diameter greater than that of the sleeve nut means for the lug bolts of the maximum and minimum bolt circle radii, and bearing on said arcuate center portion, to retain said wheel in position on the hub.

3. The combination defined in claim 2, in which said plurality of sleeve nut means include a corresponding plurality of sleeve nuts of the same outer diameter, and a plurality of cylindrical sleeves to be fitted over the sleeve nuts when the sleeve nuts are in threaded relationship with the lug bolts of the intermediate bolt circle radius.

* * * * *